(12) United States Patent
Matsumoto et al.

(10) Patent No.: US 12,723,378 B2
(45) Date of Patent: Sep. 1, 2026

(54) PERFORMANCE DIAGNOSTIC DEVICE FOR MACHINE

(71) Applicant: HITACHI CONSTRUCTION MACHINERY CO., LTD., Tokyo (JP)

(72) Inventors: Nagisa Matsumoto, Tokyo (JP); Masayuki Kakida, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 17 days.

(21) Appl. No.: 18/842,829

(22) PCT Filed: Feb. 28, 2023

(86) PCT No.: PCT/JP2023/007344

§ 371 (c)(1),
(2) Date: Aug. 30, 2024

(87) PCT Pub. No.: WO2023/167193

PCT Pub. Date: Sep. 7, 2023

(65) Prior Publication Data

US 2025/0198131 A1 Jun. 19, 2025

(30) Foreign Application Priority Data

Mar. 2, 2022 (JP) ................................ 2022-031797

(51) Int. Cl.
*E02F 9/26* (2006.01)
*G01M 13/023* (2019.01)
*G01M 13/028* (2019.01)

(52) U.S. Cl.
CPC ........... *E02F 9/267* (2013.01); *G01M 13/023* (2013.01); *G01M 13/028* (2013.01)

(58) Field of Classification Search
CPC ......... E02F 9/267; E02F 9/02; G01M 13/023; G01M 13/028; G01M 17/03; G01M 13/025; G01H 1/003; G01H 1/14
See application file for complete search history.

(56) References Cited

U.S. PATENT DOCUMENTS

2004/0030419 A1* 2/2004 Miyasaka ................ G01H 3/08
700/32
2008/0033695 A1* 2/2008 Sahara .................. G01H 1/003
702/185

(Continued)

FOREIGN PATENT DOCUMENTS

JP 53-141635 U 11/1978
JP 58-192790 U 12/1983

(Continued)

OTHER PUBLICATIONS

International Search Report of PCT/JP2023/007344 dated Apr. 11, 2023.

(Continued)

*Primary Examiner* — Anne Marie Antonucci
*Assistant Examiner* — Luis G Del Valle
(74) *Attorney, Agent, or Firm* — MATTINGLY & MALUR, PC

(57) ABSTRACT

A performance measuring and diagnosing device for a machine includes an information acquisition section, an information preprocessing section, a frequency feature distinguishing section, a frequency feature estimating section, a performance measuring and diagnosing section, and a display section. The information acquisition section acquires state information of the machine. The information preprocessing section preprocesses the state information acquired by the information acquisition section. The frequency feature distinguishing section executes frequency analysis on the data after preprocessing by the information preprocessing section to distinguish between a state frequency feature candidate and a frequency feature indicating noise. The state frequency feature candidate is a candidate for a frequency feature indicating a state of the machine. The frequency feature estimating section estimates the frequency feature corresponding to the state of the machine from among the (Continued)

state frequency feature candidates based on the state frequency feature candidate and the frequency feature indicating noise.

5 Claims, 10 Drawing Sheets

(56) References Cited

U.S. PATENT DOCUMENTS

| | | | | |
|---|---|---|---|---|
| 2013/0211665 | A1 | 8/2013 | Deimel et al. | |
| 2018/0231577 | A1 | 8/2018 | Karlsson et al. | |
| 2022/0135154 | A1* | 5/2022 | Ueno | B60Q 9/00 702/34 |

FOREIGN PATENT DOCUMENTS

| | | | |
|---|---|---|---|
| JP | 2006113002 | A | 4/2006 |
| JP | 5565120 | B2 | 8/2014 |
| JP | 6877403 | B2 | 5/2021 |

OTHER PUBLICATIONS

Extended European Search Report received in corresponding European Application No. 23763450.6 dated Feb. 6, 2026.

* cited by examiner (A)

PERFORMANCE DIAGNOSTIC DEVICE FOR MACHINE

TECHNICAL FIELD

The present invention relates to a performance diagnostic device.

BACKGROUND ART

As a part of an inspection of machinery, performance measurements are periodically performed to quantitatively determine a condition of each component of the machine. For example, when the machine is a construction machine, an operator diagnoses a condition of the construction machine by performing predetermined operations related to performance measurement after placing the construction machine in a specified state, and measuring an operation time and comparing it with a value indicating a standard performance (hereinafter referred to as a reference value).

A method for diagnosing a performance of a traveling drive system of the construction machine includes a method that measures a traveling speed. By measuring a time taken by the construction machine to travel a specified distance at the maximum traveling speed and comparing the traveling time with the reference value, it is determined whether a traveling performance meets the standard. This method requires a preparation of sufficient space for the construction machine to travel, but it is difficult to secure an appropriate space for the measurement at a work site, and the preparation for measurement is time-consuming.

In contrast, there is a method to diagnose the performance of the traveling drive system of the construction machine by measuring a rotation speed of a crawler. The operator wraps a piece of cloth or another material around a part of the crawler of the construction machine to mark it for measurement, and tilts the construction machine by lifting the crawler at one side while the construction machine is stopped, and idles the floating crawler on the spot. While confirming the marking, a time required for the crawler to rotate a specified number of times is manually measured using a stopwatch, for example, and the time is compared with a predetermined reference value to determine whether or not the standard performance is met.

In this method, there is no need to cause the construction machine to travel, and there is no need to secure a space for measurement or any time-consuming preparation is not necessary. However, a single operator usually performs this measurement. Therefore, it is necessary to simultaneously operate a lever to idle the crawler, visually check the rotation of the marking on the crawler for the specified number of rotations, and measure the time with a stopwatch. This requires multiple different operations to be performed at the same time, making the measurement process labor-intensive and leaving room for improvement in measurement accuracy. Therefore, it is desirable to develop a method to mechanically and automatically measure the crawler rotation speed without human intervention.

A method for mechanically measuring the crawler rotation speed includes a method that uses a Control Area Network (CAN) data that flows through an internal network of the construction machines. However, since the CAN data depends on specifications and performances of the construction machines, not all the construction machines can acquire this data, and it is costly to install a new sensor to acquire the CAN data. Therefore, it is considered desirable to use an external sensor that can be easily attached to the construction machine. Examples of the external sensors include a camera, a sound sensor, and an acceleration sensor.

Among these, the camera and the sound sensor are highly environment-dependent and require time-consuming preparations in advance, such as the need to ensure a stability of a scaffolding at an installation site and the need to prevent an external noise not related to the construction machine as a measurement target. Therefore, it is desirable to use a sensor that is less dependent on the environment surrounding the construction machine such that the measurement can be performed with simple preparation. The acceleration sensor is an example of a desirable sensor in consideration of the above.

It is well known how to estimate the speed and state of an object based on vibration information of the object. In the past, there is a technology that utilizes an acceleration sensor as a method for measuring a frequency of a wheel portion of a vehicle (Patent Literature 1).

A method for detecting vibration when the crawler is idling in place, rather than while the vehicle is traveling, includes a method that detects a peak point as a frequency feature in a frequency analysis. A vibration caused by collisions between parts of the crawler as it rotates is detected, and the frequency analysis is used to identify a frequency of the vibration. The prior art in another field that applies the frequency analysis to vibration data includes Patent Literature 2.

CITATION LIST

Patent Literature

Patent Literature 1: JP Patent No. 6877403
Patent Literature 2: JP Patent No. 5565120

SUMMARY OF INVENTION

Technical Problem

In Patent Literature 1, a known method such as a Kalman filter is used in a frequency analysis in a calculation of vibration. This is because a technology is intended to estimate a speed of an object, and the measurement target is limited to a traveling vehicle.

Patent Literature 2 detects a peak point based on a value of a carrier frequency of an inverter, and a position of an occurrence of the peak point need to be known in advance. The periodic vibration caused by the rotation of the crawler includes a fundamental wave having a frequency corresponding to the rotation speed, and harmonics corresponding to integer multiples of the frequency of the fundamental wave. The positions of the peak points of the fundamental and harmonic waves within the frequency band change dynamically according to the rotation speed of the crawler. Therefore, the position of the occurrence of the peak point cannot be limited in advance, and the correct peak point cannot be identified. In the measurement of the crawler rotation speed, the position and the number of peak points within the frequency band change dynamically according to the rotation speed, making it impossible to identify the correct peak point.

Another possible method for identifying frequency feature associated with the vibration of the crawler is to identify the frequency feature having the highest amplitude based on a frequency analysis result. However, since the amplitude of either the fundamental wave having the frequency corresponding to the rotation speed of the crawler or the harmonic having an integer multiple of the frequency is larger depends on the case, the frequency corresponding to the rotation speed cannot be identified by simply finding the maximum amplitude. If the amplitude of the harmonic is larger, it may incorrectly identify an inappropriate frequency feature.

The present invention is made in view of the above problems to provide a performance measuring and diagnosing device that can more appropriately diagnose the state of the machine based on the frequency analysis result acquired from the state information of the machine.

Solution to Problem

One example of a performance measuring and diagnosing device for a machine according to the present invention is a performance measuring and diagnosing device that includes an information acquisition section, an information preprocessing section, a frequency feature distinguishing section, a frequency feature estimating section, a performance measuring and diagnosing section, and a display section. The information acquisition section acquires state information of the machine. The information preprocessing section preprocesses the state information acquired by the information acquisition section. The frequency feature distinguishing section executes frequency analysis on the data after preprocessing by the information preprocessing section to distinguish between a state frequency feature candidate and a frequency feature indicating noise. The state frequency feature candidate is a candidate for a frequency feature indicating a state of the machine. The frequency feature estimating section estimates the frequency feature corresponding to the state of the machine from among the state frequency feature candidates based on the state frequency feature candidate and the frequency feature indicating noise. The performance measuring and diagnosing section identifies a feature based on a number and a position relationship of the frequency features estimated by the frequency feature estimating section and diagnoses the state of the machine. The display section displays the diagnosed state of the machine on a screen.

This specification encompasses the disclosure of Japanese Patent Application No. 2022-031797, which is the basis of the priority right of this application.

Advantageous Effects of Invention

The performance measuring and diagnosing device according to the present invention can diagnose the state of the machine more appropriately based on the frequency analysis result acquired from the state information of the machine.

BRIEF DESCRIPTION OF DRAWINGS

FIG. 8 is a flowchart describing a procedure in which a performance measuring and diagnosing section calculates a rotation speed and diagnoses a condition.

DESCRIPTION OF EMBODIMENTS

The following is a description of embodiments of the present invention based on the accompanying drawings.

Embodiment 1

Figure 1:
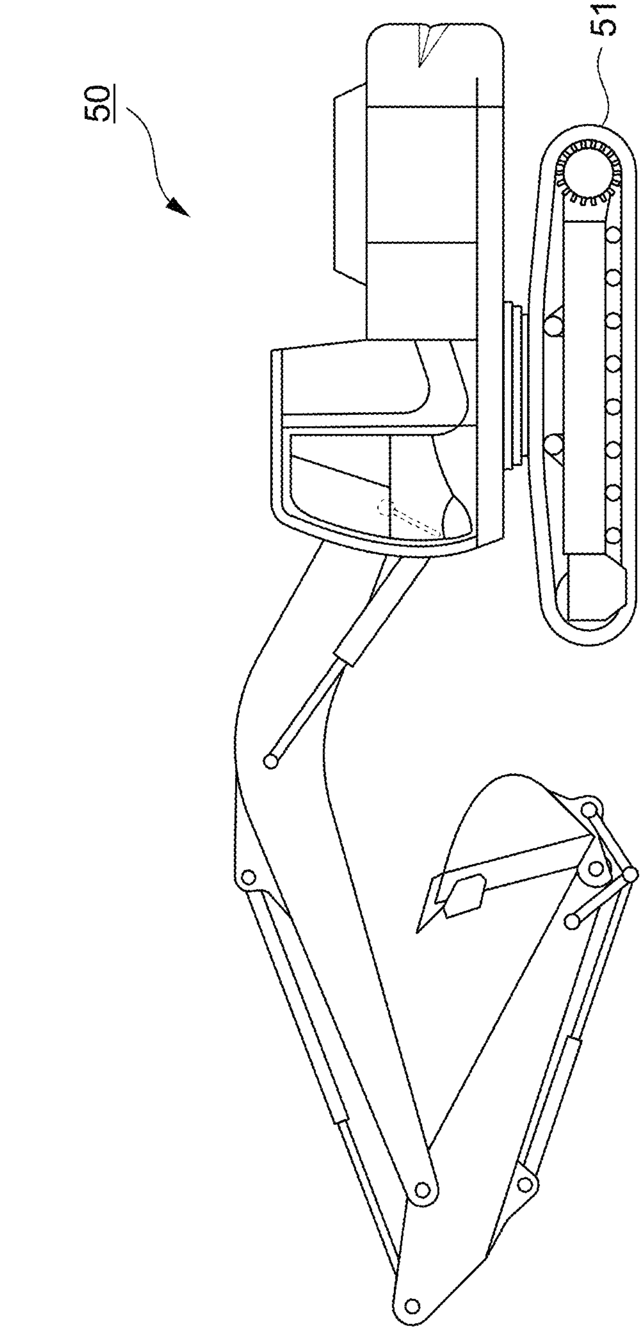
FIG. 1 illustrates an example of a machine to which Embodiment 1 of the present invention can be applied.

FIG. 1 illustrates an example of a machine to which Embodiment 1 of the present invention can be applied. This embodiment is applicable to a construction machine 50, and diagnoses a condition of the construction machine 50 by measuring its performance. The construction machine 50 includes a component (site) that generates a vibration with periodicity. This component includes a crawler 51 (crawler section).

In this embodiment, a measurement and a diagnosis concerning the vibration with periodicity in the construction machine 50 can be performed. In a modification, the component that causes an occurrence of a vibration with periodicity is not limited to the crawler 51. For example, it can be any other component including any rotating section.

Since the construction machine 50 is merely one example of a work machine to which this embodiment can be applied, and the configuration other than the crawler 51 can be arbitrarily designed by a person skilled in the art, the details are omitted. In general, the measurement and diagnosis based on vibration with periodicity is beneficial for construction machines, but the machines to which this embodiment can be applied are not limited to the construction machines, and may be other construction machines, and may be any work machine other than the construction machines. For example, it can be applied to a work machine such as an industrial robot, another rotating machine, and another machines that emits a periodic vibration.

Figure 2:
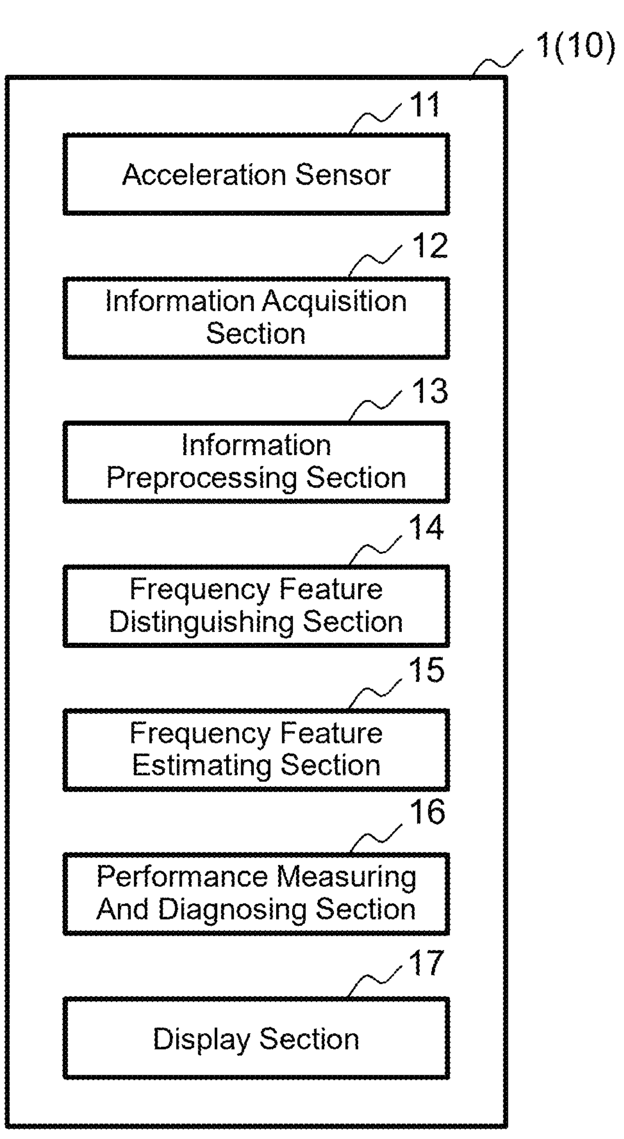
FIG. 2 is a schematic configuration diagram of a performance measuring and diagnosing device according to Embodiment 1.

FIG. 2 is a schematic configuration diagram of a performance measuring and diagnosing device 1 for the machine according to Embodiment 1. The performance measuring and diagnosing device 1 is a performance measuring and diagnosing device for measuring and diagnosing the performance of the machine, and in particular, in this embodiment, the device is used to calculate a rotation speed and diagnose a condition of the crawler 51 of the construction machine 50. In this embodiment, the performance measuring and diagnosing device 1 is configured with a mobile device 10 or the like that can be placed in any position where a certain degree of stability can be ensured during the measurement, such as in a cabin or on a body frame provided with the construction machine 50.

The performance measuring and diagnosing device 1 includes an acceleration sensor 11, an information acquisition section 12, an information preprocessing section 13, a frequency feature distinguishing section 14, a frequency feature estimating section 15, a performance measuring and diagnosing section 16, and a display section 17.

The acceleration sensor 11 mounted on the mobile device 10 is used to measure a vibration applied to the performance measuring and diagnosing device 1, for example, as 3-axis acceleration. By installing the performance measuring and diagnosing device 1 at an arbitrary position in the construction machine 50, the acceleration sensor 11 can indirectly measure the vibration generated by the crawler 51.

The information acquisition section 12 acquires state information of the construction machine 50. For example, the information acquisition section 12 receives information on vibrations caused by collisions between parts that constitute the crawler during the crawler rotation from the acceleration sensor 11, and stores the information as time series data for each axis. In this embodiment, the state information of the construction machine 50 is information representing the acceleration, but in a modification, information about a physical quantity other than the acceleration can also be used.

The information preprocessing section 13 preprocesses the state information acquired by the information acquisition section 12. For example, from the acquired time series data, the time series data within the time slot corresponding to the rotation slot of the crawler 51 is extracted.

The frequency feature distinguishing section 14 performs a frequency analysis of the data after it has been preprocessed by the information preprocessing section 13 to acquire a frequency spectrum. The peak point present in the frequency spectrum is captured as a frequency feature, which is used to distinguish between a frequency feature candidate that indicates the state of the construction machine 50 (a state frequency feature candidate) and a frequency feature that indicates noise. For example, for all the peak points in the frequency spectrum present in the slot where the features related to the operation of the construction machine 50 occur, each of the peak points is distinguished whether it is a state frequency feature candidate related to the state of the construction machine 50 or a frequency feature indicating another noise.

The frequency feature estimating section 15 estimates the frequency feature corresponding to the state of the construction machine 50 from among the state frequency feature candidates based on the state frequency feature candidates and the frequency feature indicating noise. For example, a threshold value is calculated from an amplitude at the peak point that is determined to be noise by the frequency feature distinguishing section 14, and the frequency feature corresponding to the state of the construction machine 50 is estimated from among the state frequency feature candidates based on this threshold value.

The performance measuring and diagnosing section 16 identifies the features based on the number and a position relationship of the frequency features estimated by the frequency feature estimating section 15, and diagnoses the state of the construction machine 50. For example, the frequency feature corresponding to the rotation speed of the crawler 51 is identified, and the rotation speed during the rotation of the crawler 51 is calculated. Based on the calculated rotation speed, whether the state of the construction machine 50 is normal or not is determined. Accordingly, it is possible to determine the state of the construction machine 50 based on concrete evidence.

The display section 17 includes a screen and displays a diagnosed condition of the machine on the screen. For example, the display section 17 displays the rotation speed of the crawler 51 calculated by the performance measuring and diagnosing section 16 and the results of the determination of the state of the construction machine 50 on the mobile device. At this time, the frequency spectrum diagram acquired by the frequency feature distinguishing section 14, the peak point distinguished result (the state frequency feature candidate or noise), the threshold value acquired by the frequency feature estimating section 15, and the like may be displayed together.

Figure 3:
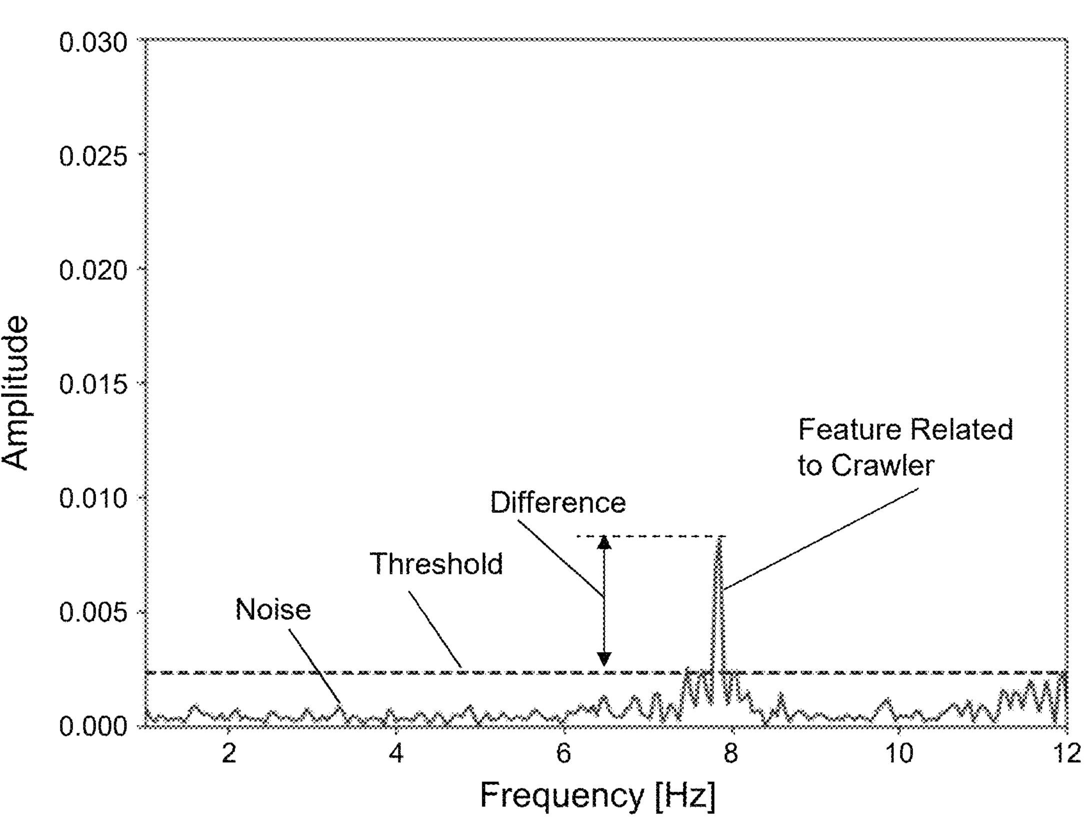
FIG. 3 is a graph describing an evaluation criterion for a frequency feature estimating section to estimate a frequency feature corresponding to a state of a construction machine.

FIG. 3 is an example of a graph describing an evaluation criterion for the frequency feature estimating section 15 to estimate the frequency feature corresponding to the state of the construction machine 50. The graph is a frequency spectrum in which the horizontal axis (X-axis) represents the frequency and the vertical axis (Y-axis) represents an energy of each frequency component. By the frequency analysis of the vibration data (for example, conversion of a time-domain representation to a frequency-domain representation), the frequency components included in the vibration can be detected.

When measuring the vibration while the crawler 51 is rotating, it is assumed that the feature of the vibration associated with the crawler 51 will appear largely because the work devices and the like other than the crawler 51 of the construction machine 50 are stopped. Therefore, when the vibration information is expressed as a frequency spectrum in which each frequency component is represented as energy, it can be assumed that the frequency features associated with the crawler 51 will appear significantly. Based on this assumption, this embodiment determines a threshold value to distinguish between areas where the power of the frequency features is large and areas of noise where they are not, and estimates the frequency features associated with the crawler 51 based on the difference from this threshold value.

Figure 4:
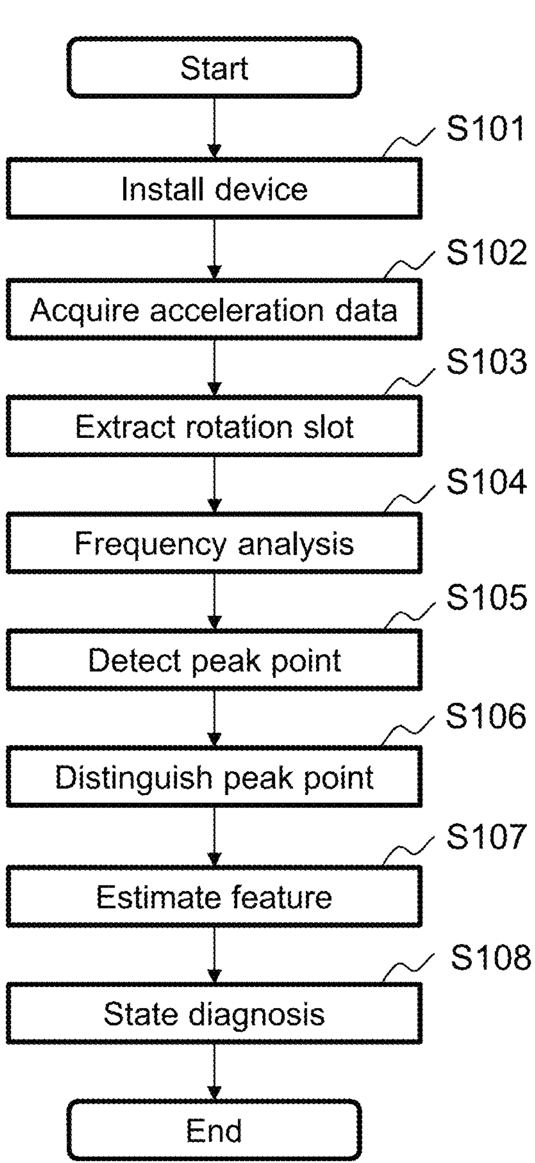
FIG. 4 is a flowchart describing a procedure in which the performance measuring and diagnosing device diagnoses a condition of a crawler of the construction machine.

FIG. 4 is a flowchart describing a procedure for diagnosing the condition of the crawler 51 of the construction machine 50 by the performance measuring and diagnosing device 1. Each step in the diagram is described below.

(FIG. 4: Step S101)

The operator places the performance measuring and diagnosing device 1 at an appropriate position on the construction machine 50. The operator may confirm whether any of the axes of detection of the acceleration sensor 11 are parallel and perpendicular to the horizontal plane. This will allow for more accurate measurements.

(FIG. 4: Step S102)

The operator starts the construction machine 50. With the construction machine 50 stopped on the spot, the construction machine 50 is tilted such that the crawler 51 on one side is lifted in the air. The crawler 51 in the air is rotated (idling). The acceleration sensor 11 acquires the vibration information from the moment the mobile device is placed on the construction machine 50 until immediately after the rotation of the crawler is completed as 3-axis acceleration, and the information acquisition section 12 acquires this information as time series data.

(FIG. 4: Step S103)

The information preprocessing section 13 extracts the slot in which the crawler 51 was rotating from the time series data acquired in S102. Specific examples of this step are described below.

(FIG. 4: Step S104)

The frequency feature distinguishing section 14 performs the frequency analysis on the time series data acquired in S103 to acquire the frequency spectrum. At this time, an autocorrelation function may be applied to emphasize the periodicity of the vibration before the frequency analysis is performed, or a window function may be applied to suppress the influence of sidelobes. These processes before the frequency analysis may be performed by the information preprocessing section 13.

(FIG. 4: Step S105)

The frequency feature distinguishing section 14 detects all the peak points from the frequency spectrum acquired in S104. The peak point is a point with a larger amplitude than the adjacent previous and following points. The specific processing of this step is described below.

(FIG. 4: Step S106)

The frequency feature distinguishing section 14 considers the peak points as frequency features in the frequency spectrum acquired in S105, and distinguishes them into the state frequency feature candidate indicating the state of the construction machine 50 and the frequency feature indicating noise. The specific processing and examples of this step are described below.

(FIG. 4: Step S107)

The frequency feature estimating section 15 calculates a threshold value from the peak points distinguished as noise in S106 and estimates the features corresponding to the state of the construction machine 50 from the state frequency feature candidates. For example, as illustrated in FIG. 3, the frequency features corresponding to the state of the construction machine 50 is estimated based on the difference between the value of the amplitude of the state frequency feature candidate and the threshold value calculated based on the amplitude of the frequency feature indicating noise. As a specific example, when the difference is greater than or equal to 0 (that is, the amplitude of the state frequency feature candidate is greater than or equal to the threshold value calculated based on the amplitude of the frequency feature indicating noise), the state frequency feature candidate is estimated as a frequency feature corresponding to the state of the construction machine 50. According to this process, the threshold value can be changed dynamically according to the magnitude of the noise. The state frequency feature candidates with amplitudes smaller than the threshold (or equal to or less than the reference value) are deleted as noise.

As an example of how to calculate the threshold value, the threshold value is set based on the assumption that the feature as an outlier when compared with the noise is the feature corresponding to the state of the construction machine 50 that should be focused on. Specifically, the average $+3\sigma$ of the amplitude of the peak points distinguished as noise may be set as the reference value. Note that a represents the standard deviation of the amplitude of the peak point corresponding to the noise. This is because when the distribution of amplitudes of the peak points distinguished as noise is based on a normal distribution, 99% of the noise will be included in the range equal to or less than the mean $+3\sigma$, and outliers not included in this range can be regarded as frequency features corresponding to the state of the construction machine 50. This calculation method is just an example, and the mean or median value may be simply set as the threshold value.

In addition, the person skilled in the art can design the processing for the case where there is no peak point that is distinguished as noise in S106. For example, the threshold value may be set to 0.

(FIG. 4: Step S108)

The performance measuring and diagnosing section 16 calculates the rotation speed of the crawler 51 by identifying the frequency features corresponding to the rotation speed of the crawler 51 based on the number and position relationship of the frequency features corresponding to the state of the construction machine 50, as estimated in S107, to diagnose the state of the construction machine 50. Specific processing and examples of this step are described below.

Figure 5:
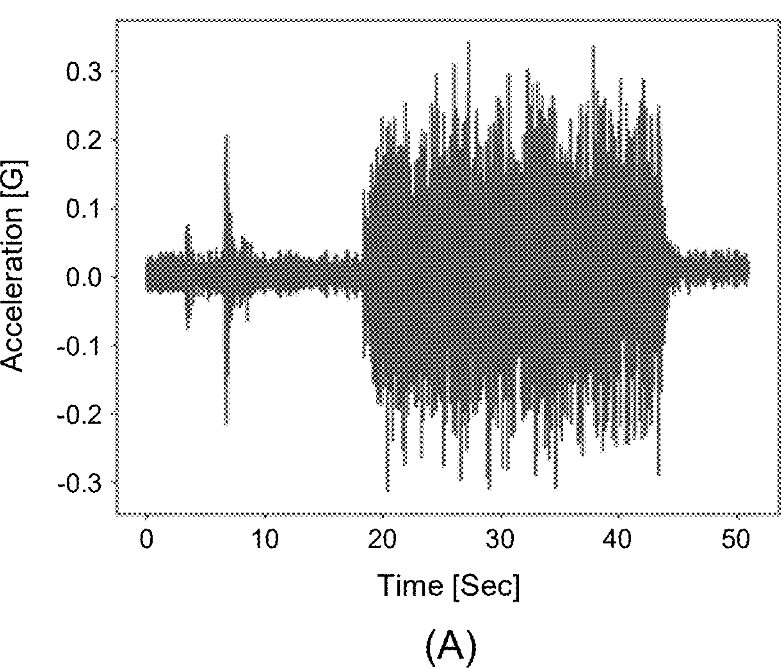
FIG. 5 is a diagram describing a specific example of S103.
Figure 5:
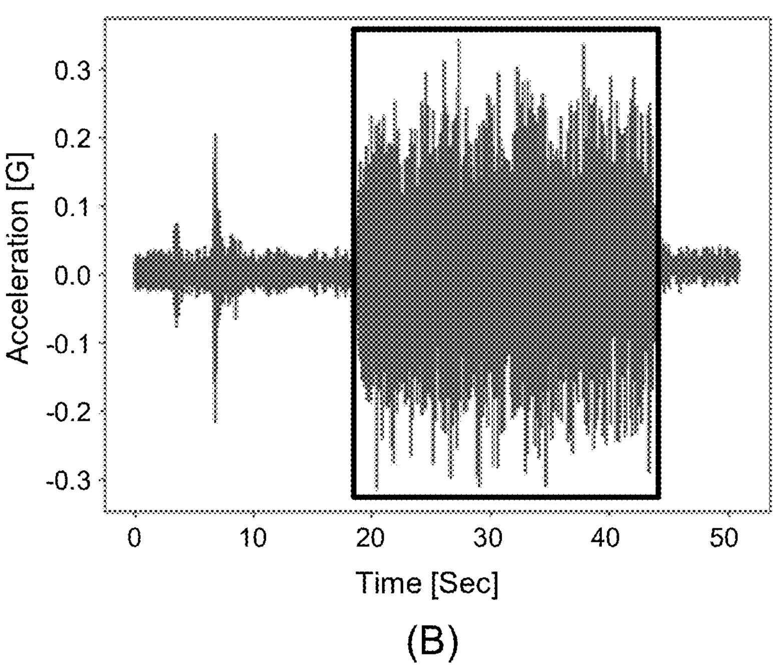

FIGS. 5(A) and 5(B) illustrate a specific example in S103. The time series of acceleration sensor data acquired in S102 includes both the slot where the crawler is stopped and the slot where the crawler is rotating, as illustrated in FIG. 5(A). Therefore, it is necessary to extract the slot in which the crawler is rotating from the data.

When the crawler 51 is stationary, the displacement of the acceleration sensor data is close to zero (that is, the amplitude is small), and when the crawler 51 is rotating, the displacement of the acceleration sensor is large. Therefore, as illustrated by the bold rectangle in FIG. 5(B), the slot where the displacement of the acceleration sensor data remains large is extracted as the slot where the crawler 51 is rotating. The time-series acceleration sensor data for the slot in which the crawler 51 is rotating (rotation slot) is acquired. At this time, all the data in the rotation slot may be used, or some of the data in the rotation slot may be extracted from the data in the rotation slot. The slot where the amplitude is gradually changing at the beginning and end of the rotation of the crawler 51 may also be excluded from the rotation slot.

Figure 6:
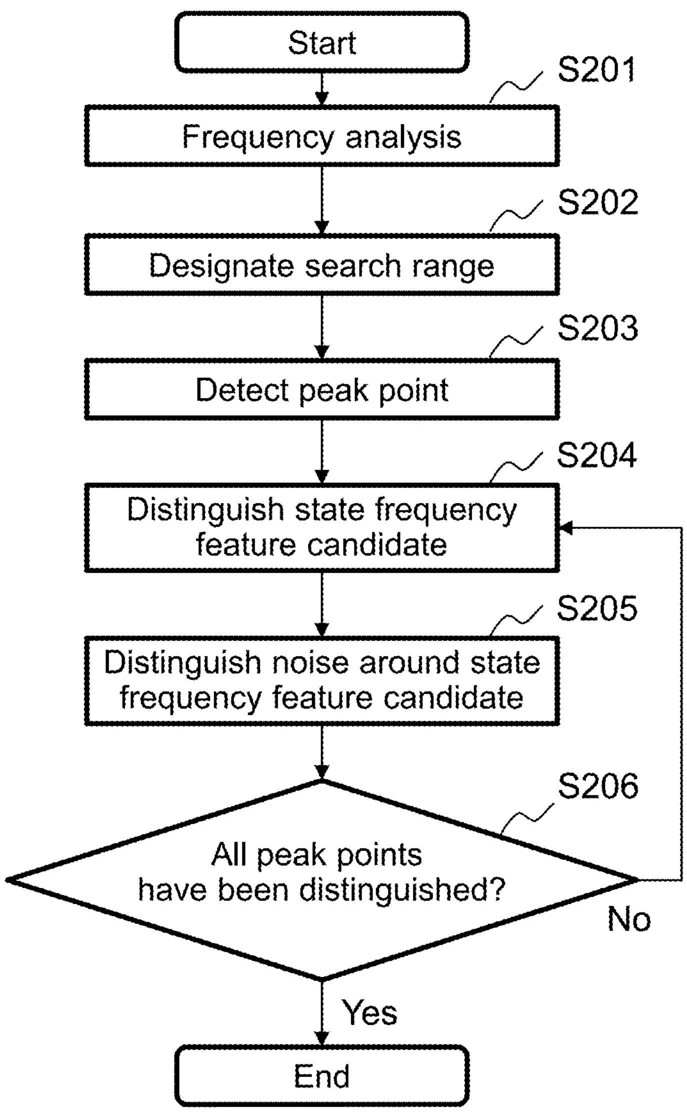
FIG. 6 is a flowchart describing a procedure in which a frequency feature distinguishing section distinguishes a peak point.

FIG. 6 is a flowchart illustrating a specific example processing in S104 to S106. The frequency feature distinguishing section 14 takes the peak points present in the frequency spectrum after the frequency analysis as the frequency feature and distinguishes them into the state frequency feature candidate indicating the state of the construction machine 50 and the frequency feature indicating noise. Each step in the figure is described below.

(FIG. 6: Step S201)

The frequency analysis is performed on the time series data after the preprocessing in Step S103 is completed, and the frequency spectrum is acquired. This step corresponds to Step S104 in FIG. 4.

Steps S202 and S203 correspond to Step S105 in FIG. 4.

(FIG. 6: Step S202)

For the frequency spectrum acquired in S201, a range within a predetermined range of a frequency band in which the frequency feature candidate indicating the state of the construction machine 50 may occur (hereinafter referred to as "search range") is used to search for peak points. The search range may be determined based on the results of verification in advance or based on the range of the rotation speeds to be measured. As an example, in this embodiment, since the crawler rotation speed to be measured is assumed to be in the range of 1 Hz to 12 Hz based on the possible values, the frequency spectrum is acquired using the slot as the search range.

(FIG. 6: Step S203)

All the peak points present in the search range are extracted in S202. The peak point is defined as a point where the amplitude value is greater than the adjacent previous and following points.

Steps S204 to S206 correspond to Step S106 in FIG. 4.

(FIG. 6: Step S204)

Among the plurality of peak points extracted in S203 (for example, all the peak points), the peak point with the largest amplitude is distinguished as the state frequency feature candidate, which is a candidate for the frequency feature indicating the state of the construction machine 50 (state frequency feature candidate distinguishing processing). In this process, the peak points that have already been distinguished as the state frequency feature candidate or the noise are excluded from the search for the peak point with the largest amplitude.

(FIG. 6: Step S205)

The peak points present within a predetermined range (for example, within 1 Hz each before and after the peak point distinguished as the state frequency feature candidate in S204) are distinguished as the frequency feature indicating noise (noise distinguishing processing). In this embodiment, the feature distinguishing is performed on the condition that the peak points corresponding to the state frequency feature candidates are separated from one another by 1 Hz or more. Therefore, the peak points present within 1 Hz each before and after the feature candidate are distinguished as noise. The condition of 1 Hz is defined by the fact that the fundamental frequency and a harmonic have an integer multiple relationship. The lower limit of the search range in this embodiment is 1 Hz. When the frequency corresponding to the rotation speed of the crawler 51 is 1 Hz, which is the lowest frequency in the search range, it is assumed that harmonics occur at 1 Hz intervals. In other words, since it is necessary to search for the feature candidates at 1 Hz intervals at the minimum, the intervals before and after the peak point is set to 1 Hz. Using such a range, the appropriate distinguishing can be performed for the crawler generally used for the construction machines.

(FIG. 6: Step S206)

It is determined whether or not all the peak points present in the search range have been determined. When there is any undetermined peak point, the process returns to S204 and continues (S206: No). In the second S204 (an additional distinguishing processing), among the plurality of peak points, the peak points that have already been distinguished as the state frequency feature candidate and the peak points that have been distinguished as the frequency feature indicating noise are excluded. Among the peak points, the peak point with the largest amplitude is further distinguished as the state frequency feature candidate. In the second S205 (the additional distinguishing processing), the peak points present within 1 Hz each before and after the newly distinguished state frequency feature candidate are distinguished as noise. Such an iterative processing of distinguishing between the state frequency feature candidate and noise can appropriately distinguish the plurality of state frequency feature candidates. Thus, the frequency feature distinguishing section 14 performs the additional state frequency feature candidate distinguishing processing and the noise distinguishing processing for the peak points that have not been distinguished within a predetermined range of the frequency band.

When all the peak points have been distinguished, the process in the frequency feature distinguishing section 14 is completed (S206: Yes). Thus, in this embodiment, the additional distinguishing processing of S204 and S205 is repeatedly performed until all the plurality of peak points in the search range are distinguished as either the state frequency feature candidate or the frequency feature indicating noise. Finally, the set of the peak points distinguished as the state frequency feature candidate and the set of the peak points distinguished as noise are output. This repetitive process allows the state frequency feature candidates to be distinguished more appropriately, and the process of Step S107 described above is executed using these distinguished peak points.

As a modification, Steps S204 and S205 may be repeated a specified number of times. In this case, since a certain number or more of peak points need to be distinguished as either the state frequency feature candidate or noise, the peak points need to be distinguished at least once or more.

Figure 7:
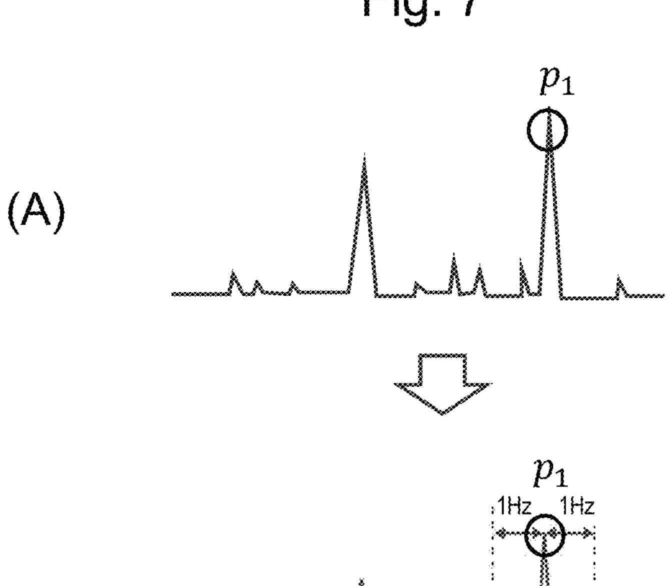
FIG. 7 illustrates diagrams describing specific examples of S204, S205, and S206.
Figure 7:
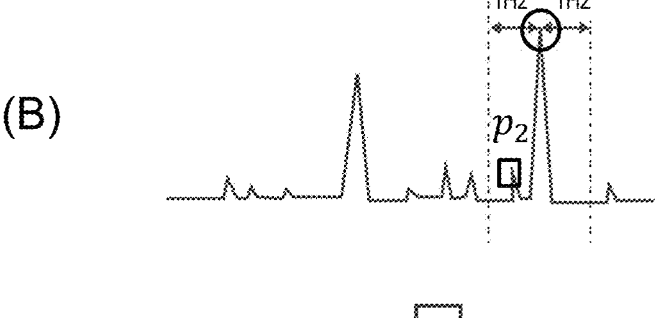
Figure 7:
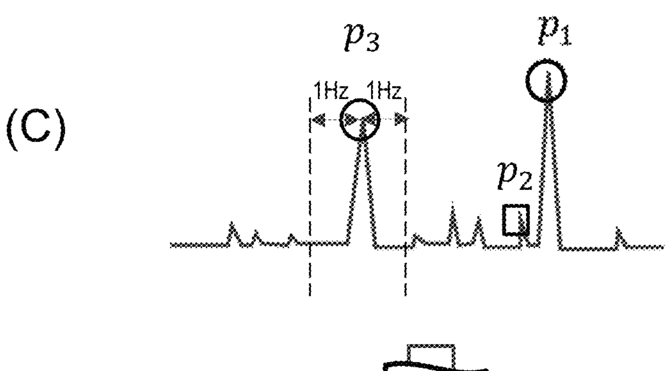
Figure 7:
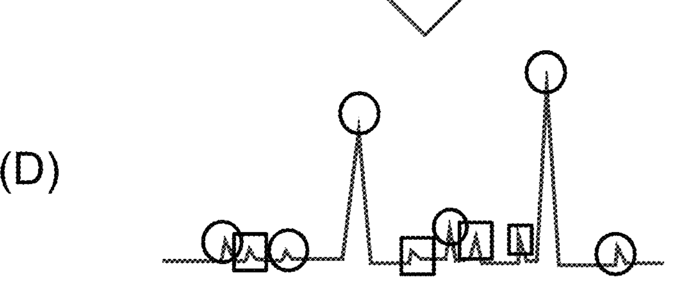

Using FIG. 7, a specific processing procedure in S204, S205, and S206 is described. FIG. 7 illustrates a frequency spectrum where the vertical axis is the power of the frequency feature and the horizontal axis is the frequency.

First, in S204, the peak point with the largest amplitude in the search range determined in S202 is searched, and the peak point $p_1$ is determined as the state frequency feature candidate. The result is illustrated in FIG. 7(A). Next, in S205, the peak point $p_2$ present within a range of 1 Hz each before and after $p_1$ is distinguished as noise. The result is illustrated in FIG. 7(B). At S206, it is determined whether all the peak points in the search range have been determined. Since all the peak points have not been distinguished at the time of FIG. 7(B) yet, the process returns to S204 to repeat the state frequency feature candidate distinguishing processing and the noise distinguishing processing.

In the second S204, the peak point $p_3$ with the largest amplitude is searched for among the peak points excluding $p_1$ and $p_2$, for which the distinguishing has already been completed, and is distinguished as the state frequency feature candidate. In the following second S205, the peak points present at 1 Hz each before and after the peak point $p_3$ are searched for, but since no peak point is present, the noise distinguishing processing is not performed. The result after the second S204 and S205 processing is illustrated in FIG. 7(C). Accordingly, the peak points present in the search range are distinguished as either the state frequency feature candidates or noise.

FIG. 7(D) illustrates how all the peak points in the frequency spectrum were distinguished as either the state frequency feature candidates or noise, with the peak points surrounded by a round frame as the state frequency feature candidate and the peak points surrounded by a square frame as the noise.

Figure 8:
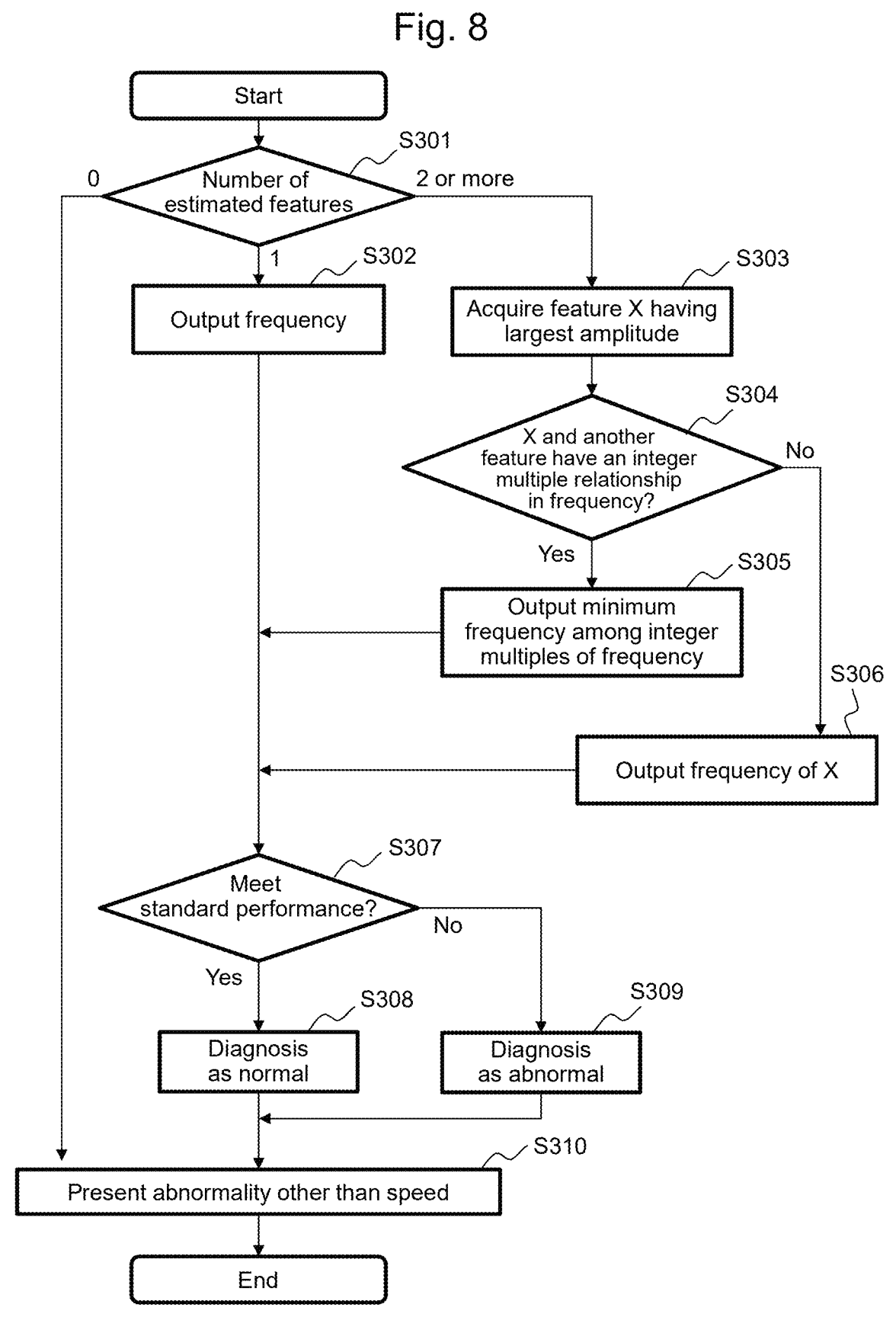

FIG. 8 is a flowchart describing a procedure in which the performance measuring and diagnosing section 16 performs the calculation of the rotation speed and diagnosis of the state. The performance measuring and diagnosing section 16 identifies the frequency corresponding to the rotation speed of the crawler 51 based on the number and the position relationship of frequency features corresponding to the state of the construction machine estimated by the frequency feature estimating section 15. Each step of FIG. 8 is described below.

(FIG. 8: Steps S301 to S303)

The number of frequency features estimated by the frequency feature estimating section 15 is confirmed. When the number of frequency features is zero (S301: zero), the frequency features corresponding to the state of the construction machine 50 could not be acquired and the process proceeds to S310 (as a modification, the process may be terminated). In this case, the display section 17 may present an instruction to perform the measurement again.

When there is one frequency feature estimated by the frequency feature estimating section 15 (S301: One), the state of the construction machine 50 is diagnosed based on the frequency feature. Specifically, the process proceeds to Step S302 where the frequency of the frequency feature is output as corresponding to the rotation speed of the crawler 51.

When there are plurality of frequency features estimated by the frequency feature estimating section 15 (S301: Two or more), the state of the construction machine 50 is diagnosed based on the position relationship of the respective frequency features. Specifically, the process proceeds to Step S303 to acquire the frequency feature having the largest amplitude from among the frequency features.

Accordingly, the different processing is performed according to the number of frequency features estimated by the frequency feature estimating section 15, allowing for more flexible diagnostic processing.

(FIG. 8: Steps S304 to S306)

In Step S304, it is determined whether the frequency of the frequency feature acquired in S303 is an integer multiple of a frequency of another frequency feature. This determination need not be made strictly on whether or not they are integer multiples, and a predetermined error range may be considered. When there are the frequency features in a relationship where their frequencies are integer multiples of one another (S304: Yes), it can be inferred that they are in a relationship between the fundamental wave and a harmonic wave. Therefore, the process proceeds to Step S305 where the smallest frequency among those frequency features is output as corresponding to the rotation speed of the crawler 51. When there are no other frequency features that correspond to the integer multiple (S304: No), the process proceeds to Step S306 where the frequency acquired in S303 (frequency of the frequency feature having the largest amplitude) is output as corresponding to the rotation speed of the crawler 51.

(FIG. 8: Steps S307 to S309)

In Step S307, a time required for the crawler 51 to rotate one rotation is calculated from the frequency identified in S302, S305, or S306, and this is the rotation speed of the crawler 51. The rotation speed is calculated, for example, using the following formula (1). The calculated rotation speed is checked against whether it satisfies the standard performance to determine whether the condition of the construction machine 50 is normal or abnormal.

Rotation speed (sec/rotation)=rotation time for one rotation (sec)=track links constituting crawler (times/rotation)/frequency (times/sec) (1)

When the rotation speed satisfies the standard performance, the process proceeds to Step S308 to diagnose that the condition of the construction machine 50 is normal. When the rotation speed does not meet the standard performance, the process proceeds to Step S309 to diagnose that the condition of the construction machine 50 is abnormal.

(FIG. 8: Step S310)

This step need not necessarily be performed, but after diagnosing whether or not the construction machine 50 is normal based on the rotation speed of the crawler 51, a determination may be made as to whether another abnormality (other than speed) is occurring. For example, when there are plurality of features that are not in a relationship of integer multiples of one another, in S306, only the frequency feature having the largest amplitude is treated as corresponding to the rotation speed, and another frequency feature is not treated as corresponding to the rotation speed. When the frequency feature not treated as corresponding to the rotation speed is known to be related to some other abnormality, the performance measuring and diagnosing section 16 may diagnose the cause and possibility of the abnormality based on the frequency features in S310, and the display section 17 may present the cause and possibility of the abnormality.

Figure 9:
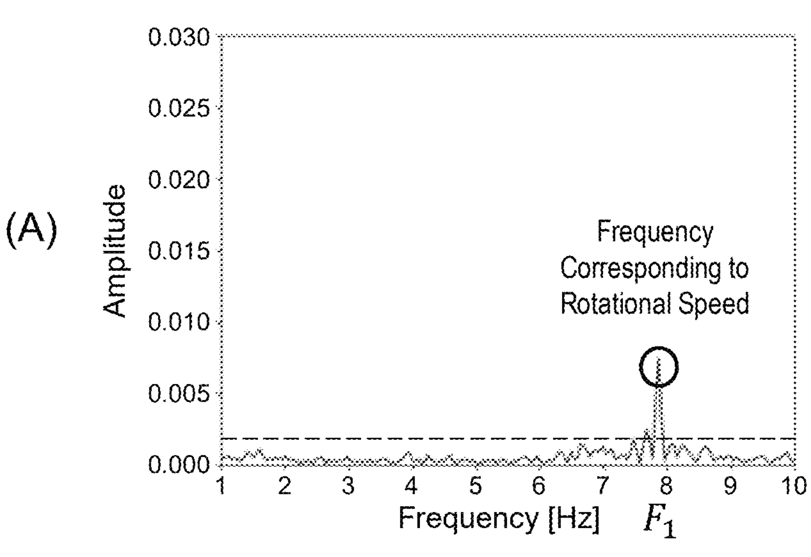
FIG. 9 illustrates diagrams describing specific examples of S302, S305, and S306.
Figure 9:
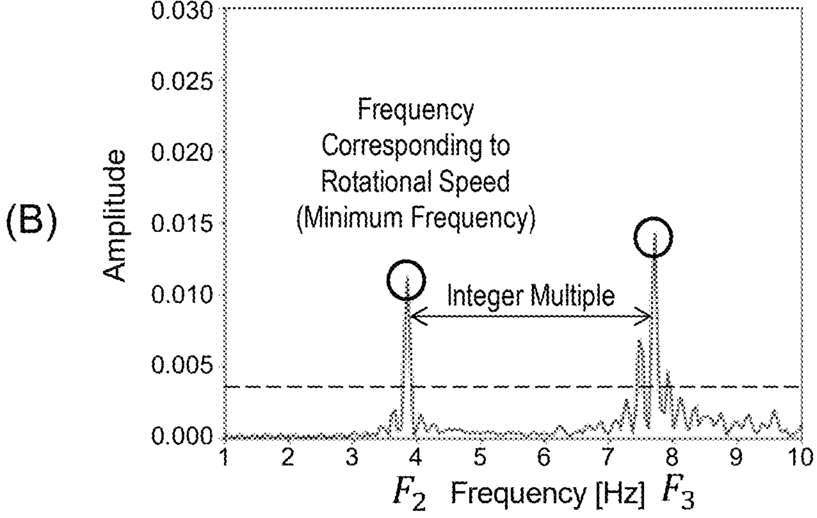
Figure 9:
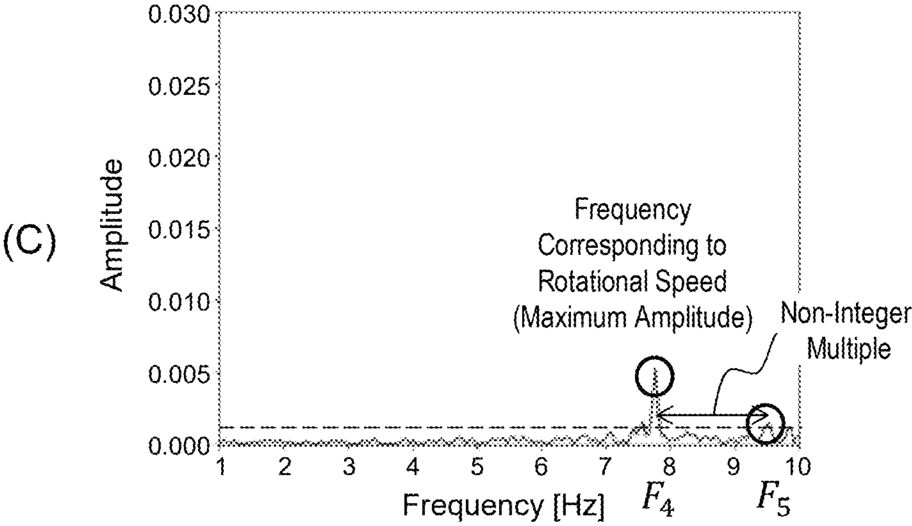

FIG. 9 illustrates diagrams describing specific examples of S302, S305, and S306. The dashed lines in each graph indicate a threshold value. FIG. 9(A) illustrates a specific example in S302. This figure illustrates the case where only one frequency feature corresponding to the state of the construction machine 50 is estimated. In this case, the estimated frequency $F_1$ is selected as the one corresponding to the rotation speed of the crawler 51 (that is, the frequency feature corresponding to the state of the construction machine 50).

FIG. 9(B) illustrates a specific example in S305. The frequency feature may appear as a harmonic at a frequency corresponding to an integer multiple of the frequency corresponding to the rotation speed of the crawler 51. Therefore, depending on the rotation speed, the plurality of peak points may appear in the search range, which are the frequency $F_2$ corresponding to the rotation speed of the crawler 51 and the frequency $F_3$ corresponding to its harmonics. Thus, when there are plurality of frequency features in an integer multiple relationship, the smaller frequency $F_2$ is selected as the one corresponding to the rotation speed (that is, the frequency feature corresponding to the state of the construction machine 50).

FIG. 9(C) illustrates a specific example in S306. The frequency feature may appear due to the noise that could not be eliminated by the frequency feature estimating section 15 or a vibration of another component of the construction machine 50 (for example, the frequency $F_5$ in FIG. 9(C)). Since the vibration occurring during the rotation of the crawler 51 is mainly specific to the crawler, the frequency feature is expected to be larger than other features. Therefore, the frequency feature having the largest amplitude is acquired and the frequency $F_4$ is selected as the one corresponding to the rotation speed (that is, the frequency feature corresponding to the state of the construction machine 50).

Embodiment 1: Summary

The performance measuring and diagnosing device 1 according to Embodiment 1 estimates the frequency features corresponding to the state of the construction machine 50 by distinguishing the frequency feature candidate indicating the state of the construction machine 50 (the state frequency feature candidates) and the feature indicating noise from the frequency analysis results acquired from the vibration information caused by the crawler 51, and identifies the frequency corresponding to the rotation speed of the crawler 51. By dynamically distinguishing the state frequency feature candidate and the noise, the rotation speed of the crawler 51 can be calculated more accurately, independent of the position of the frequency corresponding to the rotation speed and the number of its harmonics, thereby enabling more appropriate diagnosis of the state of the construction machine 50. In addition, in Embodiment 1, the measurement is conducted with the components of the construction machine 50 other than the crawler 51 stationary. Thus, the traveling performance can be evaluated without actually causing the construction machine 50 to travel.

Embodiment 2

Figure 10:
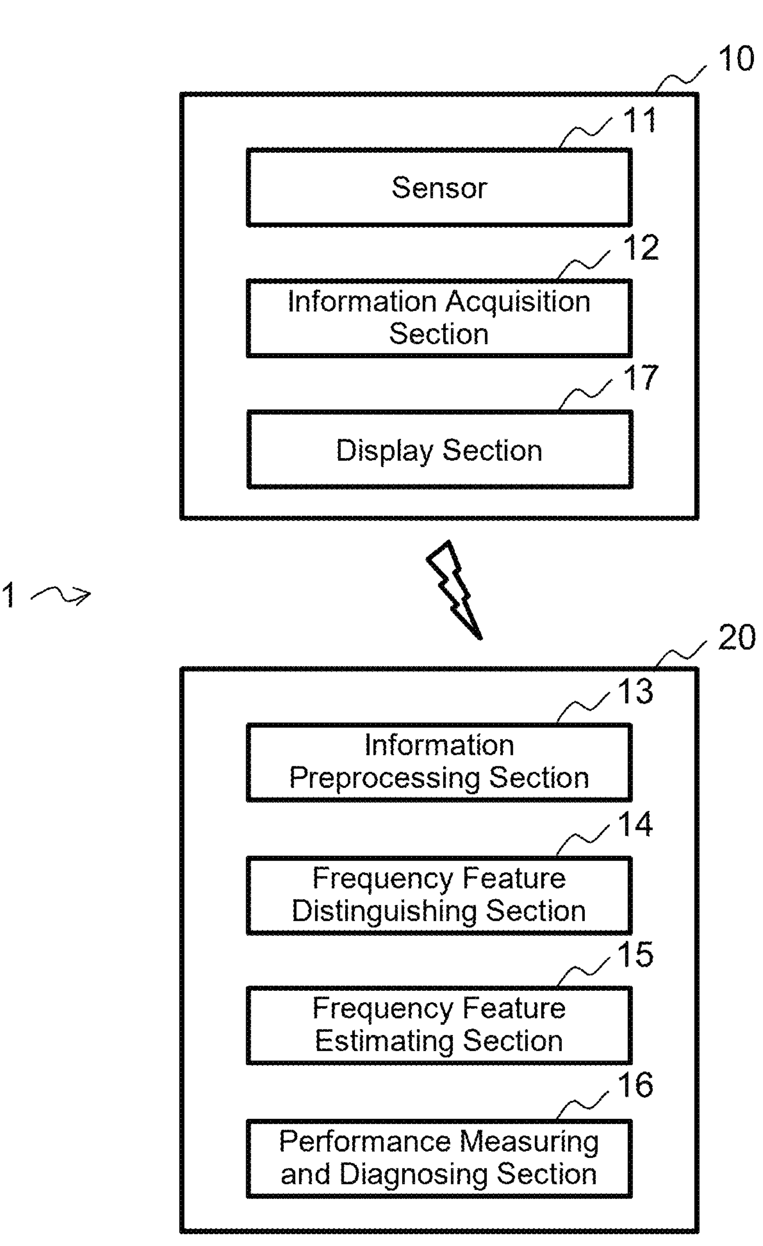
FIG. 10 is a schematic configuration diagram of a performance measuring and diagnosing device according to Embodiment 2.

In Embodiment 2 of the present invention, as illustrated in FIG. 10, the performance measuring and diagnosing device 1 includes a mobile device 10 and a cloud 20. The acceleration sensor 11, the information acquisition section 12, and the display section 17 are provided on the mobile device 10, and the information preprocessing section 13, the frequency feature distinguishing section 14, the frequency feature estimating section 15, and the performance measuring and diagnosing section 16 are provided on the cloud 20. The mobile device 10 and the cloud 20 may be provided with configurations for sending and receiving information via wireless communication with one another. In the above points, Embodiment 2 differs from Embodiment 1 described above, but the other configurations are similar to those of Embodiment 1.

By configuring the mobile device 10 and the cloud 20 such that the communication is possible between them, for example, the acquired sensor data can be uploaded to the cloud 20, and the frequency analysis and the performance measurement diagnosis can be performed on the cloud 20. The results of the performance measurement and diagnosis calculated on the cloud 20 can be sent to the mobile device 10 and confirmed on the display section 17 of the mobile device 10.

With the performance measuring and diagnosing device 1 in this configuration, the same effects as in Embodiment 1 described above can be acquired. Furthermore, since the information preprocessing section 13, the frequency feature distinguishing section 14, the frequency feature estimating section 15, and the performance measuring and diagnosing section 16 are provided on the cloud 20, the performance measuring and diagnosis can be performed independent of the performance of the mobile device 10, in comparison with the case where all the processing is performed on the mobile device 10. In addition, the performance measurement diagnosis and the confirmation of the results can be performed at any timing.

Modification of Each Embodiment

In the above embodiments and their modifications, the performance measuring and diagnosing device 1 diagnoses the state of the construction machine 50 (for example, whether it is normal or not) based on the rotation status of the crawler 51, but it is also possible to diagnose the state of the components of the construction machine 50. For example, when used as a device to diagnose the condition of the crawler 51, it can be interpreted as a calculation of the rotation speed and the like, as a physical quantity representing the condition of the crawler 51.

The present invention is not limited to the above-mentioned embodiments and modifications thereof, but includes various other modifications. For example, the above embodiments are described in detail for the purpose of describing the present invention in an easy-to-understand manner, and are not necessarily limited to those having all of the described configurations. It is also possible to replace some of the configurations of one embodiment with configurations of other embodiments, and it is also possible to add configurations of other embodiments to the configuration of one embodiment. It is also possible to add, delete, or replace some of the configurations of each embodiment with other configurations.

REFERENCE SIGNS LIST

1 Performance measuring and diagnosing device
10 Mobile device
11 Acceleration sensor
12 Information acquisition section
13 Information preprocessing section
14 Frequency feature distinguishing section
15 Frequency feature estimating section
16 Performance measuring and diagnosing section
17 Display section
20 Cloud
50 Construction machine
51 Crawler
$F_1$ Frequency (Frequency feature corresponding to machine condition)
$F_2$ Frequency (Frequency feature corresponding to machine condition)
$F_3$ Frequency
$F_4$ Frequency (Frequency feature corresponding to machine condition)
$F_5$ Frequency
$p_1$ Peak point (State frequency feature candidate)
$p_2$ Peak point (Noise)
$p_3$ Peak point (State frequency feature candidate)

All publications, patents and patent applications cited herein are incorporated herein by reference without modification.

The invention claimed is:

1. A performance measuring and diagnosing device installed on a vehicle for measuring and diagnosing performance of the vehicle, comprising:

an acceleration sensor;

an information acquisition section that acquires state information of the machine;

an information preprocessing section that preprocesses the state information acquired by the information acquisition section;

a frequency feature distinguishing section that executes frequency analysis on data after preprocessing by the information preprocessing section to distinguish between a state frequency feature candidate and a frequency feature indicating noise, the state frequency feature candidate being a candidate for a frequency feature indicating a state of the machine;

a frequency feature estimating section that estimates the frequency feature corresponding to the state of the machine from among the state frequency feature candidates based on the state frequency feature candidate and the frequency feature indicating noise; and a performance measuring and diagnosing section that identifies a feature based on a number and a position relationship of the frequency features estimated by the frequency feature estimating section and diagnoses the state of the machine; and a display section that displays the diagnosed state of the machine on a screen, wherein the performance measuring and diagnosing section:

diagnoses the state of the machine based on a frequency of the frequency feature when the number of the frequency feature estimated by the frequency feature estimating section is one;

diagnoses the state of the machine based on a smallest frequency among the frequencies of a plurality of the frequency features when the number of the frequency features estimated by the frequency feature estimating section is plural and the frequency of the frequency feature having a largest amplitude among the plurality of frequency features is an integer multiple of the frequency of another frequency feature; and diagnoses the state of the machine based on a frequency of the frequency feature having the largest amplitude when the number of the frequency features estimated by the frequency feature estimating section is plural and the frequency of the frequency feature having the largest amplitude among the plurality of frequency features is not an integer multiple of the frequency of another frequency feature, and wherein the frequency feature distinguishing section executes:

a state frequency feature candidate distinguishing processing of distinguishing a peak point having a largest amplitude among a plurality of peak points included within a predetermined range in a frequency band, as the state frequency feature candidate;

a noise distinguishing processing of distinguishing peak points present within a predetermined range before and after the peak point distinguished as the state frequency feature candidate, as the frequency feature indicating noise; and an additional distinguishing processing of additionally executing the state frequency feature candidate distinguishing processing and the noise distinguishing processing on the undistinguished peak points within a predetermined range of the frequency band, wherein the information acquisition section acquires state information of a component that generates a vibration with a periodicity, as the state information of the machine, and wherein the information acquisition section acquires a detection value of the vibration of the vehicle detected by the acceleration sensor.

2. The performance measuring and diagnosing device according to claim 1, wherein the component includes a crawler of a construction machine, and wherein the performance measuring and diagnosing section calculates a rotation speed of the crawler while the crawler rotates.

3. The performance measuring and diagnosing device according to claim 1, wherein the frequency feature distinguishing section repeatedly executes the additional distinguishing processing until all of the plurality of peak points are distinguished to be the state frequency feature candidate or the frequency feature indicating noise.

4. The performance measuring and diagnosing device according to claim 1, wherein the frequency feature estimating section estimates a frequency feature corresponding to the state of the machine based on a difference between an amplitude value of the state frequency feature candidate and a threshold value calculated based on an amplitude of the frequency feature indicating noise.

5. The performance measuring and diagnosing device according to claim 1, wherein the predetermined range is a range of 1 Hz each before and after the peak point.

* * * * *